Oct. 5, 1954  J. H. SAGE  2,690,767
SELECTOR VALVE MECHANISM
Filed Aug. 23, 1949  2 Sheets-Sheet 1

Inventor:
James Henry Sage;
By his attorneys,
Baldwin, Wight, & Prevost

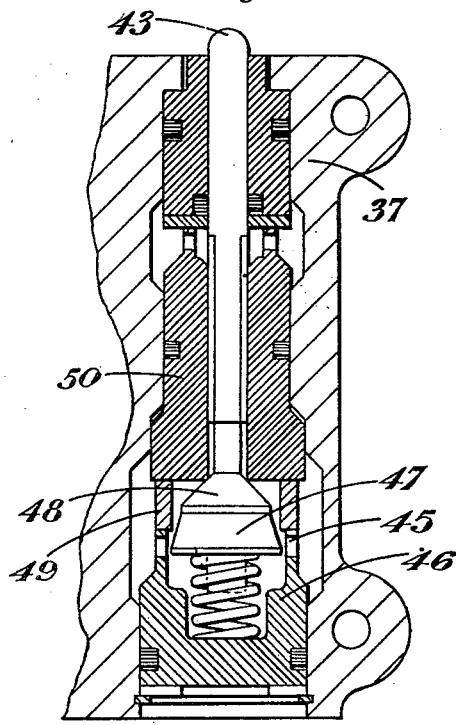
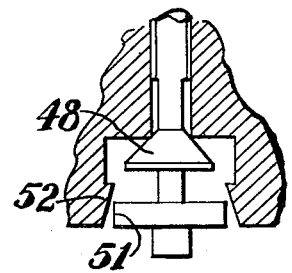

Patented Oct. 5, 1954

2,690,767

UNITED STATES PATENT OFFICE 2,690,767

SELECTOR VALVE MECHANISM

James Henry Sage, Widnes, England, assignor to Electro-Hydraulics Limited, Warrington, England, a company of Great Britain Application August 23, 1949, Serial No. 111,911

4 Claims. (Cl. 137—622)

This invention relates to selector valve mechanism for use in fluid pressure operated systems by which, on selective operation of a valve, fluid pressure is transmitted from a suitable source to means for operating a member.

It is well known to transmit fluid pressure from a pump or a compressor to an operating member, such as a jack, or from one operating member to another by means of control members, such as valves. One of the difficulties in such pressure operated systems is the uneven motion of the operating member if the rate at which fluid can be exhausted through the control valve under the action of the external load is greater than the rate at which fluid is admitted to the pressure side of the operating member through a substantially simultaneously operated control valve.

It is an object of the present invention to construct the operating valves in such a way that the amount of fluid supplied to the pressure side of the operating member will be substantially equal to the amount of fluid returned from the exhaust side and will substantially maintain this ratio also when the external load on the operating member is reversed during its travel.

In a selector valve mechanism according to the present invention there is provided a pair of valves or ports, one of which controls the supply of fluid pressure to cause actuation of an operating member, and the other the return of fluid pressure from the exhaust side of the said member, the two valves or ports being so formed that during the whole period of actuation of the mechanism the supply port operative area is greater than the exhaust port operative area, whereby the exhaust side of the operating member is maintained under fluid pressure.

The invention may be carried into effect by providing lift valves in which case it is preferable to provide a pair of valve assemblies, each assembly comprising two valves.

The valves may be conical and preferably are of different cross-sectional area, the angle of the cone of the exhaust valve being smaller than that of the supply or input valve, so that an equal displacement of both valves in the valve assembly will produce a smaller exhaust port operative area. In an alternative to the latter case one or both valves in each assembly may be formed with two conical surfaces of different pitch to cooperate with two valve seats so as to provide a restriction greater on the exhaust valve than on the supply.

Figure 1:
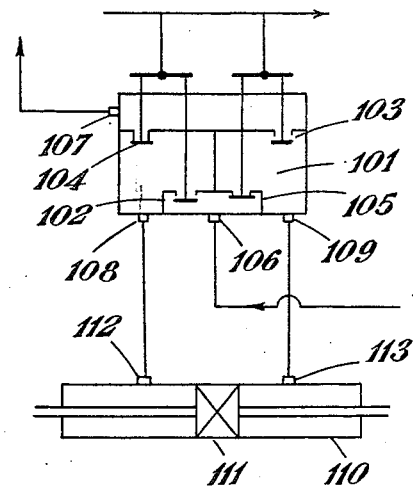
Figure 2:
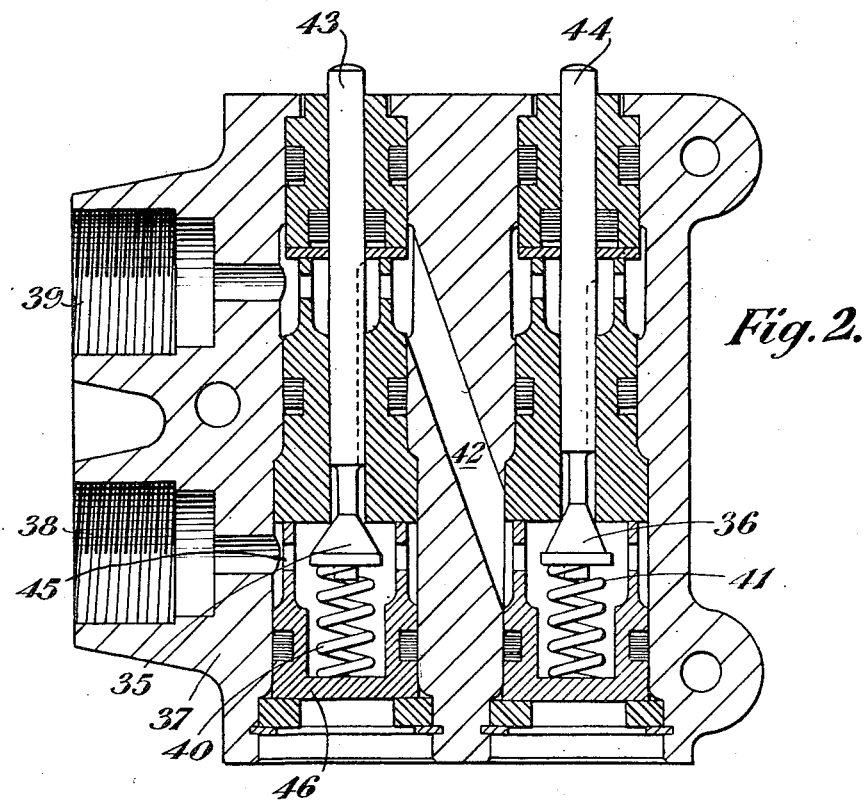

The invention is illustrated diagrammatically in the accompanying drawings in which Figure 1 shows a fluid operated system including the valve selector mechanism. Figure 2 is a vertical section through one form of selector, and Figure 3 a view of a modified form, and Figure 4 a detailed view of a still further modified form.

Referring now to the circuit shown in Figure 1 the system comprises a selector 101 which contains two pairs of valves 102, 103 and 104, 105, a fluid inlet connection 106, an exhaust connection 107 and known means to open and close the said valves. From the selector connections 108 and 109 fluid passes into the connections 112 and 113 of the jack 110 and acts on a double-acting piston 111, which jack and piston constitute the operating member.

Referring to the form of selector valve mechanism shown in Figure 2 the selector comprises two valve assemblies such as 102, 104, Figure 1, and 103, 105, Figure 1. Each valve assembly comprises a pair of valves 35, 36, the valve 35 being an input valve and controlling the supply of fluid to the operating member such as the jack 110, Figure 1, and the other valve 36 the exhaust valve for the return of fluid pressure from the exhaust side of the jack.

The pair of valves 35, 36, in each assembly are coupled together and the two pairs are coupled to a common actuating member (see Figure 1), the arrangement being such that when the actuating member is moved the supply valve of one pair is opened and its exhaust valve closed, whilst the exhaust valve of the other pair is opened and the supply valve closed, as shown diagrammatically in Figure 1. The operating member is again in the form of a double-acting jack. The selector also includes a fluid inlet connection and an exhaust connection and connections to each side of the jack cylinder (not shown). The pair of valves 35, 36 is provided in a valve body 37 forming one valve assembly, and the said valve body includes an input connection 38, and the connection 39 leading to one side of the jack. In the input connection 38 is arranged the supply valve 35 which is of conical formation and which is closed by a spring 40. The exhaust valve 36 which is also spring biased by a spring 41 is likewise of conical formation, but the angle of the cone of the exhaust valve is smaller than that of the supply valve. A passage 42 is provided in the valve assembly body which allows communication from the exhaust valve to the supply connection to the jack.

It will be appreciated that the other pair of valves in the other valve assembly is identical.

The selector works as follows: A lever is actuated to depress simultaneously the stems 43, 44 respectively of the supply valve in one assembly and the return valve in the other assembly, so that the said valves are open. Fluid under pressure passes from the source of supply through the connection 38 into the selector, through an aperture 45 in the spring support 46 of the supply valve, past the supply valve 35, into the connection 39 in the selector body leading to the jack. Fluid from the other side of the jack piston will pass into the selector mechanism through the return valve 36 into exhaust or tank. It will be appreciated that reverse movement of the lever closes the valves which had previously been opened and opens the valves previously closed, so that fluid pressure is supplied to the other side of the piston, which as stated above is of the double-acting type.

Alternative forms of exhaust valves are shown in Figures 3 and 4. In Figure 3 the valve is of double conical formation as seen at 47, 48, an additional valve seat being provided by a sleeve 49, which can be attached to or integral with the spring support 46 or with a member 50 through which the valve stem passes.

As will be seen from Figure 4 the valve instead of being of double conical formation as in Figure 3 can be of single conical formation as at 48 and of cylindrical formation as shown at 51 in which case the valve seat 52 would be of conical shape.

The constructions illustrated in Figures 3 and 4 can be varied by adding not one but a multitude of additional valves and corresponding valve seats.

I claim:

1. A selector valve mechanism comprising a valve body, a pair of valve seats in said body, valve elements of the poppet type engageable with the respective seats, said body having ports for the flow of fluid under the control of said valves, each valve element having a conical portion engaging its seat and one of said valve elements having at least a portion the cone angle of which is smaller than the angle of the cone of the other valve whereby equal opening movement of said valves will produce a smaller area of opening of the seat associated with said one valve than the seat associated with the other valve, and actuating means connected to both valve elements for alternately moving them away from their seats to equal extents.

2. A selector valve mechanism comprising a valve body, a pair of valve seats in said body, a poppet valve engageable with each seat, said body having openings for the flow of fluid under the control of said valves, each valve being conical and the angle of the cone of one valve being smaller than the angle of the cone of the other valve whereby equal opening movement of said valves will produce a smaller area of opening of said one valve than said other valve, and actuating means connected to both valves for alternately opening them to equal extents.

3. A selector valve mechanism comprising a body having ports, a pair of valve devices associated with said ports, said valve devices being simultaneously operable and each being movable to open or close associated ports, one of said valve devices having a head comprising two conical valve surfaces of different pitch cooperating with surrounding surfaces one of which is a valve seat to be engaged by one such conical surface and the other of which is a surface cooperating with the other of said conical surfaces to restrict flow of fluid around said other conical surface.

4. A selector valve mechanism comprising a body having ports, a pair of valve devices associated with said ports, said valve devices being simultaneously operable and each being movable to open or close associated ports, a valve seat for each valve device, one of said valve devices having spaced portions one of which comprises a poppet valve engageable with the associated seat, said body below such seat having a surface surrounding and in spaced relation to the other portion of said one valve device and the space between such surface and said other portion of said one valve device tapering to increase in cross sectional area away from said valve seat and serving to restrict the flow of fluid through said valve seat when said poppet valve moves from its seat.

References Cited in the file of this patent

UNITED STATES PATENTS

| Number | Name | Date |
|---|---|---|
| 726,369 | Sullivan | Apr. 28, 1903 |
| 863,522 | Farley | Aug. 13, 1907 |
| 1,478,670 | Mattingly | Dec. 25, 1923 |
| 1,595,458 | Doolittle | Aug. 10, 1926 |
| 1,935,119 | Guild | Nov. 14, 1933 |
| 2,000,805 | West et al. | May 7, 1935 |
| 2,157,240 | Keel | May 9, 1939 |
| 2,172,981 | Maglott | Sept. 12, 1939 |
| 2,208,421 | Hanna | July 16, 1940 |
| 2,231,959 | Sloan | Feb. 18, 1941 |
| 2,266,365 | Harrison | Dec. 16, 1941 |
| 2,323,947 | Van Der Werff | July 13, 1943 |
| 2,395,633 | Livers | Feb. 26, 1946 |
| 2,396,643 | De Ganahl et al. | Mar. 19, 1946 |
| 2,409,765 | Kehle | Oct. 22, 1946 |
| 2,477,669 | Stephens | Aug. 2, 1949 |
| 2,485,349 | Barr | Oct. 18, 1949 |
| 2,526,361 | Johnson | Oct. 17, 1950 |
| 2,608,214 | Renick | Aug. 26, 1952 |